(12) United States Patent
Kanezaki (10) Patent No.: US 10,323,795 B2
(45) Date of Patent: Jun. 18, 2019

(54) HIGH PRESSURE TANK

(71) Applicant: HONDA MOTOR CO., LTD., Minato-ku, Tokyo (JP)

(72) Inventor: Toshihiko Kanezaki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 43 days.

(21) Appl. No.: 15/834,298

(22) Filed: Dec. 7, 2017

(65) Prior Publication Data

US 2018/0163927 A1    Jun. 14, 2018

(30) Foreign Application Priority Data

Dec. 13, 2016 (JP) ................. 2016-241526

(51) Int. Cl.
  *F17C 1/00*   (2006.01)
  *F17C 13/06*  (2006.01)
  (Continued)

(52) U.S. Cl.
  CPC ............ *F17C 13/06* (2013.01); *F16J 12/00* (2013.01); *F16J 15/10* (2013.01); *F17C 1/00* (2013.01);
  (Continued)

(58) Field of Classification Search
  CPC ............ F17C 1/06; F17C 2221/012; F17C 2205/0305; F17C 2270/0168; F17C 1/00; F17C 13/06; F16J 15/10
  (Continued)

(56) References Cited

U.S. PATENT DOCUMENTS 9,920,881 B2    3/2018  Nakamura et al.
2010/0025411 A1*  2/2010  Otsubo ................. F17C 1/14
                                                      220/581

(Continued)

FOREIGN PATENT DOCUMENTS

JP    2010-180969    8/2010
JP    2013-137092    7/2013

(Continued)

OTHER PUBLICATIONS

Japanese Office Action for Japanese Patent Application No. 2016-241526 dated Sep. 11, 2018.

*Primary Examiner* — Shawn M Braden
(74) *Attorney, Agent, or Firm* — Amin, Turocy & Watson LLP (57) ABSTRACT

A high pressure tank includes a resin liner, a cap, a seal member, and a collar. The liner contains fluid. The cap has a supply/discharge hole for supplying/discharging the fluid to/from the liner. The collar has a passage hole connected to the supply/discharge hole. A tubular portion of the liner is inserted into the supply/discharge hole, and held between an outer circumferential surface of the collar and an inner circumferential surface of the supply/discharge hole. The seal member is provided in a seal groove formed in the inner circumferential surface of the supply/discharge hole. A fluid inlet channel is formed at least in one of the cap and the collar, for guiding the fluid from a protruding end of the tubular portion into the seal groove through space between the inner circumferential surface of the supply/discharge hole and the outer circumferential surface of the tubular portion.

5 Claims, 5 Drawing Sheets

(51) Int. Cl.
  *F17C 1/16* (2006.01)
  *F17C 13/00* (2006.01)
  *F16J 12/00* (2006.01)
  *F16J 15/10* (2006.01)
  *F17C 1/06* (2006.01)

(52) U.S. Cl.
  CPC ............... *F17C 1/06* (2013.01); *F17C 1/16* (2013.01); *F17C 13/00* (2013.01); *F17C 13/002* (2013.01); *F17C 2201/0109* (2013.01); *F17C 2201/056* (2013.01); *F17C 2203/011* (2013.01); *F17C 2203/0604* (2013.01); *F17C 2203/066* (2013.01); *F17C 2203/0619* (2013.01); *F17C 2203/0663* (2013.01); *F17C 2203/0673* (2013.01); *F17C 2205/0305* (2013.01); *F17C 2205/0311* (2013.01); *F17C 2205/0323* (2013.01); *F17C 2221/012* (2013.01); *F17C 2223/0123* (2013.01); *F17C 2223/036* (2013.01); *F17C 2260/036* (2013.01); *F17C 2270/0168* (2013.01)

(58) Field of Classification Search
  USPC .......................................................... 220/581
  See application file for complete search history.

(56) References Cited

U.S. PATENT DOCUMENTS

2013/0341337 A1* 12/2013 Patterson ................. F17C 1/06
                                                            220/586
2016/0200284 A1*  7/2016 Yi ............................ F17C 1/00
                                                            220/582
2017/0268724 A1*  9/2017 Kanezaki ................. F17C 1/04
2018/0163927 A1*  6/2018 Kanezaki ................. F16J 12/00

FOREIGN PATENT DOCUMENTS

JP      2015-031307      2/2015
WO      2015/114953      8/2015

* cited by examiner

HIGH PRESSURE TANK

CROSS-REFERENCE TO RELATED APPLICATION

This application is based upon and claims the benefit of priority from Japanese Patent Application No. 2016-241526 filed on Dec. 13, 2016, the contents of which are incorporated herein by reference.

BACKGROUND OF THE INVENTION

Field of the Invention

The present invention relates to a high pressure tank including a resin liner containing fluid, and a cap having a supply/discharge hole for supplying/discharging the fluid to/from the liner.

Description of the Related Art

The high pressure tank is used widely in various applications, as a container containing fluid such as gas or liquid. For example, the high pressure tank is mounted in a fuel cell vehicle, as a tank containing hydrogen gas to be supplied to a fuel cell system.

The high pressure tank of this type includes a hollow liner. The liner is made of resin, and the outer surface of the liner is covered with a reinforcing layer made of fiber reinforced plastic. A tubular portion protrudes from the liner. A cap is attached to the tubular portion. The cap has a supply/discharge hole for supplying/discharging fluid to/from the inside of the liner. A valve is provided for the supply/discharge hole. By operating the valve, the supply/discharge hole is opened/closed.

In general, in the high pressure tank of this type, space between the liner and the cap is sealed by a seal member. For example, in Japanese Laid-Open Patent Publication No. 2015-031307, in the structure where the cap is inserted into the tubular portion, a seal member is attached to an outer circumferential surface of the cap to seal the space between the outer circumferential surface of the cap and an inner circumferential surface of the tubular portion. However, in the structure, there is a concern that the tubular portion is pressed, and expanded by the internal pressure of the fluid in a direction away from the seal member. Further, since the material of the liner is resin, it is expected that deformation by compression occurs in the inner circumferential surface of the tubular portion due to the creep. When such a situation occurs, since the distance (seal gap) between the inner circumferential surface of the tubular portion and the outer circumferential portion of the cap is increased, it becomes difficult to obtain the sufficient sealing performance.

In this regard, for example, as described in Japanese Laid-Open Patent Publication No. 2013-137092, it may be possible to adopt structure where, in contrast to the above, a tubular portion is inserted into a supply/discharge hole of a cap, and a seal member is interposed between an outer circumferential surface of the tubular portion and an inner circumferential surface of the supply/discharge hole. In this case, the seal member is attached to the inner circumferential surface of the cap, and the internal pressure is applied to press the tubular portion toward the seal member. As a result, the tubular portion presses and contacts the cap to provide so-called self-sealing structure. Therefore, it is possible to maintain a substantially constant seal gap, and suitably seal the space between the tubular portion and the cap.

In the structure, the pressure of fluid is applied to the tubular portion also from the protruding end surface of the tubular portion. Therefore, if the strength of the tubular portion is not sufficient, the tubular portion tends to be spaced from the cap easily. Further, if the tubular portion is deformed by compression due to the decrease in the temperature, the creep, or the like, the seal gap becomes large. After all, the sealing performance is degraded. In order to avoid the problem, in the liner described in Japanese Laid-Open Patent Publication No. 2013-137092, a metal reinforcement member is embedded in a front end surface of the tubular portion to increase the strength of the tubular portion.

SUMMARY OF THE INVENTION

However, embedding of a metal reinforcing member in the front end surface of the resin tubular portion as in the case of Japanese Laid-Open Patent Publication No. 2013-137092 makes the structure complicated. Further, since operation of assembling the reinforcement member to the tubular portion is required, the production step become laborious. Further, in the high pressure tank of this type, it is desirable to improve the durability of the self-sealing structure so as to maintain the excellent seal performance for long time.

A main object of the present invention is to provide a high pressure tank having simple structure in which it is possible to maintain a constant seal gap between a liner and a cap, and thus, it is possible to maintain the excellent sealing performance for long time.

According to an embodiment of the present invention, a high pressure tank capable of supplying/discharging fluid is provided. The tank includes a liner, a cap, a collar, and a seal member. The liner is made of resin, and configured to contain the fluid. A tubular portion protruding from the liner has an internal insertion hole. The cap has a supply/discharge hole. The tubular portion is configured to be inserted into the supply/discharge hole. The collar is configured to be inserted into the insertion hole. The collar includes a cylindrical body having an internal passage hole connected to the liner. The tubular portion is held between an outer circumferential surface of the cylindrical body and an inner circumferential surface of the supply/discharge hole. The seal member is provided in a seal groove formed in the inner circumferential surface of the supply/discharge hole. The seal member is configured to seal a space between the inner circumferential surface of the supply/discharge hole and the outer circumferential surface of the tubular portion. A fluid inlet channel is formed at least in one of the cap and the collar, for guiding the fluid from a protruding end of the tubular portion into the seal groove through the space between the inner circumferential surface of the supply/discharge hole and the outer circumferential surface of the tubular portion.

In the high pressure tank according to the present invention, the tubular portion of the liner is provided along the inner circumferential surface of the supply/discharge hole of the cap, and the seal member is provided between the outer circumferential surface of the tubular portion and the inner circumferential surface of the supply/discharge hole. Therefore, the internal pressure of the fluid is applied in a direction to press the tubular portion toward the seal member to provide so-called self-sealing structure. As a result, even if the high internal pressure is applied, it is possible to maintain a constant distance (seal gap) between the outer circumferential surface of the tubular portion gripping the seal member and the inner circumferential surface of the cap, and suitably seal the space between the outer circumferential surface of the tubular portion and the inner circumferential surface of the cap. Further, the liner having the above tubular portion can be obtained easily by blow molding, and the liner can be assembled to the cap easily.

Further, in the high pressure tank, the tubular portion is held between the outer circumferential surface of the collar and the inner circumferential surface of the supply/discharge hole. Therefore, even if the pressure of the fluid is applied to the tubular portion from the protruding end surface, or deformation by compression occurs in the tubular portion due to the decrease in the temperature, the creep, etc., peeling of the tubular portion from the inner circumferential surface of the supply/discharge hole is suppressed. That is, it is possible to suitably maintain the state of the seal gap for long time. Further, the collar is provided along the inner circumferential surface of the insertion hole, and has simple structure. Therefore, it is possible to avoid complicated structure unlike the case where the collar is embedded in the wall of the tubular portion. Further, the collar can be assembled to the cap and the tubular portion easily.

Further, in the high pressure tank, the fluid inlet channel is formed at least in one of the cap and the collar. By the fluid inlet channel, the fluid is guided from the protruding end of the tubular portion into the seal groove through a space between the inner circumferential surface of the supply/discharge hole and the outer circumferential surface of the tubular portion to increase the internal pressure of the seal groove. As a result, it becomes possible to apply pressure to the portion of the tubular portion facing the seal groove substantially uniformly from the inner circumferential surface and the outer circumferential surface. Therefore, it is possible to avoid infiltration of the tubular portion into the seal groove. Also for this reason, it becomes possible to suitably maintain the state of the seal gap for long time.

Further, as described above, when the fluid is guided from the protruding end of the tubular portion, the seal member is pressed toward a side (toward the proximal end of the tubular portion) opposite to the side where the fluid is supplied. Accordingly, the seal member is compressed in the seal groove, and it is possible to easily maintain the state having the desired sealing performance.

As described above, in the high pressure tank according to the present invention, it is possible to maintain a constant seal gap between the liner and the cap for long time, and thus, it is possible to maintain the excellent sealing performance for long time.

In the high pressure tank, preferably, at least part of the fluid inlet channel is formed by a cap groove formed in the inner circumferential surface of the supply/discharge hole, and the cap groove is connected to the seal groove. In this case, with the simple structure of the fluid inlet channel formed between the outer circumferential surface of the tubular portion and the cap groove, the fluid is guided into the seal groove. Therefore, it becomes possible to suitably maintain the state of the seal gap for long time.

In the high pressure tank, preferably, at least part of the fluid inlet channel is formed by a through hole passing through the inner circumferential surface and the outer circumferential surface of the tubular portion. In this case, the fluid is guided into a space between the outer circumferential surface of the cylindrical body and the inner circumferential surface of the tubular portion from the inside of the tubular portion through the through hole. Then, the fluid flows between the inner circumferential surface of the supply/discharge hole and the outer circumferential surface of the tubular portion through the protruding end of the tubular portion, and the fluid is guided into the seal groove. In this case, with the simple structure of the fluid inlet channel formed in the through hole of the tubular portion, the fluid can be guided into the seal groove. Therefore, it becomes possible to suitably maintain the state of the seal gap for long time.

In the high pressure tank, preferably, the collar includes a head provided in a marginal portion at one end of the cylindrical body to contact the protruding end surface of the tubular portion, and at least part of the fluid inlet channel is formed by a collar groove provided in the head. In this case, with the simple structure of the fluid inlet channel formed in the collar groove, the fluid can be guided from the protruding end of the tubular portion into the seal groove through the space between the outer circumferential surface of the tubular portion and the inner circumferential surface of the supply/discharge hole. Therefore, it becomes possible to suitably maintain the state of the seal gap for long time.

In the high pressure tank, preferably, at least part of the fluid inlet channel is formed by an axial groove provided in an outer circumferential surface of the collar to extend from one end to the other end of the collar in an axial direction. In this case, with the simple structure of the fluid inlet channel formed between the inner circumferential surface of the tubular portion and the axial groove, the fluid can be guided from the proximal end to the protruding end of the tubular portion, and then, guided into the seal groove through the space between the inner circumferential surface of the supply/discharge groove and the outer circumferential surface of the tubular portion. Therefore, it becomes possible to suitably maintain the state of the seal gap for long time.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, preferred embodiments of a high pressure tank according to the present invention will be described in detail with reference to the accompanying drawings.

For example, the high pressure tank according to the present invention is mounted in a fuel cell vehicle, and can be used suitably for containing a hydrogen gas to be supplied to a fuel cell system. Therefore, the embodiment of the present invention will be described in connection with an example where the high pressure tank contains the hydrogen gas as the fluid to be supplied to the fuel cell system.

However, the present invention is not limited in this respect. The high pressure tank according to the present invention may contain any fluid other than the hydrogen gas.

Figure 1:
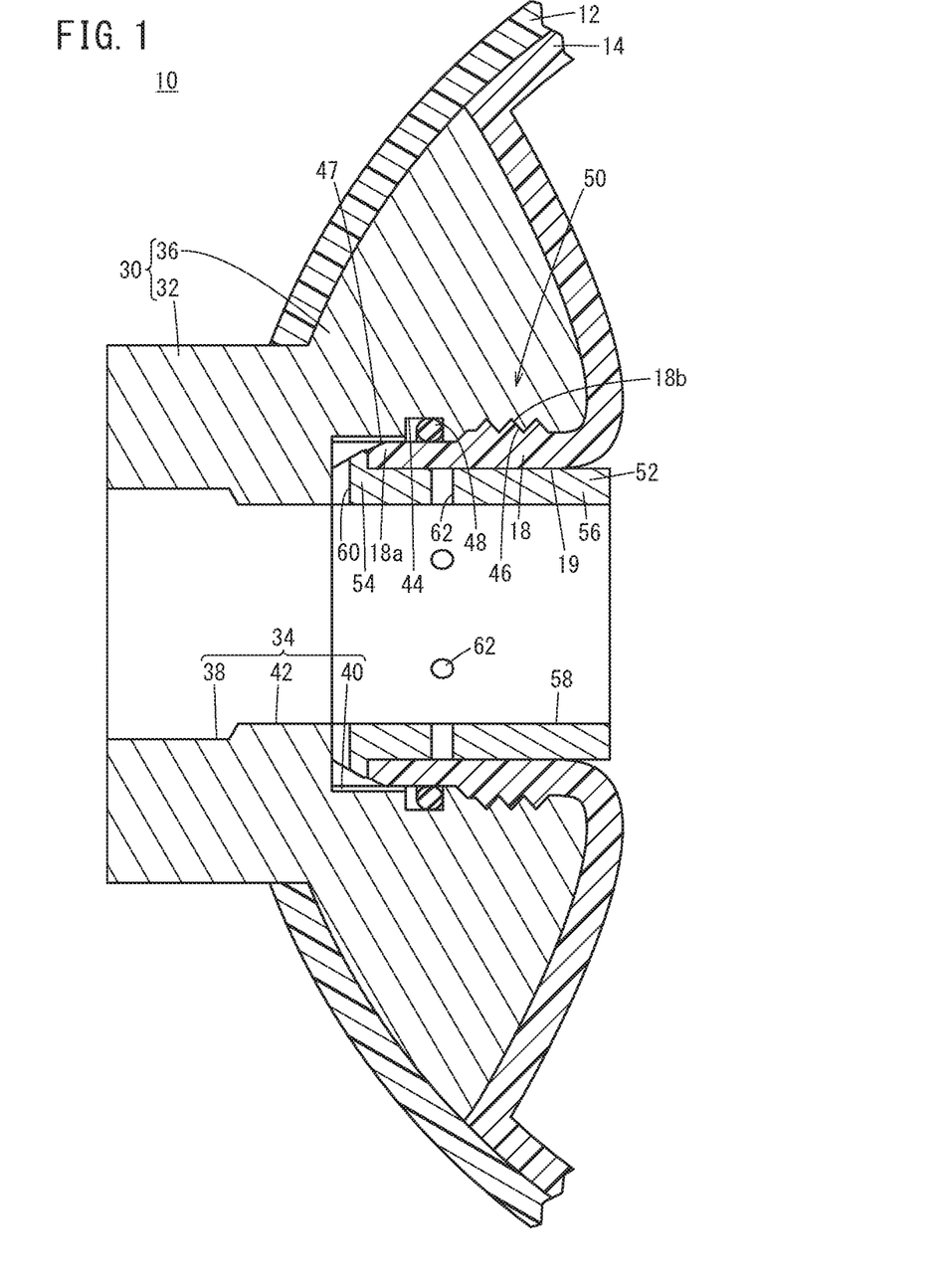
FIG. 1 is a cross sectional view schematically showing main components of a high pressure tank according to an embodiment of the present invention, as viewed in an axial direction of a tubular portion of a high pressure tank.

As shown in FIG. 1, the high pressure tank 10 according to the embodiment of the present invention contains a hydrogen gas in a hollow space of a liner 14. The outer circumference of the liner 14 is covered with a reinforcing layer 12 made of fiber reinforced plastic. It should be noted that the hollow space in the liner 14 is not shown in the drawings. The liner 14 is made up of a plurality of resin layers. At one end, the liner 14 is oriented inward, and then, depressed. A tubular portion 18 protrudes at the one end of the liner 14. In the following description, a surface of the liner 14 which faces a hollow space in the liner 14 will also be referred to as the inner surface, and the reverse side (exposed surface) of the inner surface will also be referred to as the outer surface.

Figure 2:
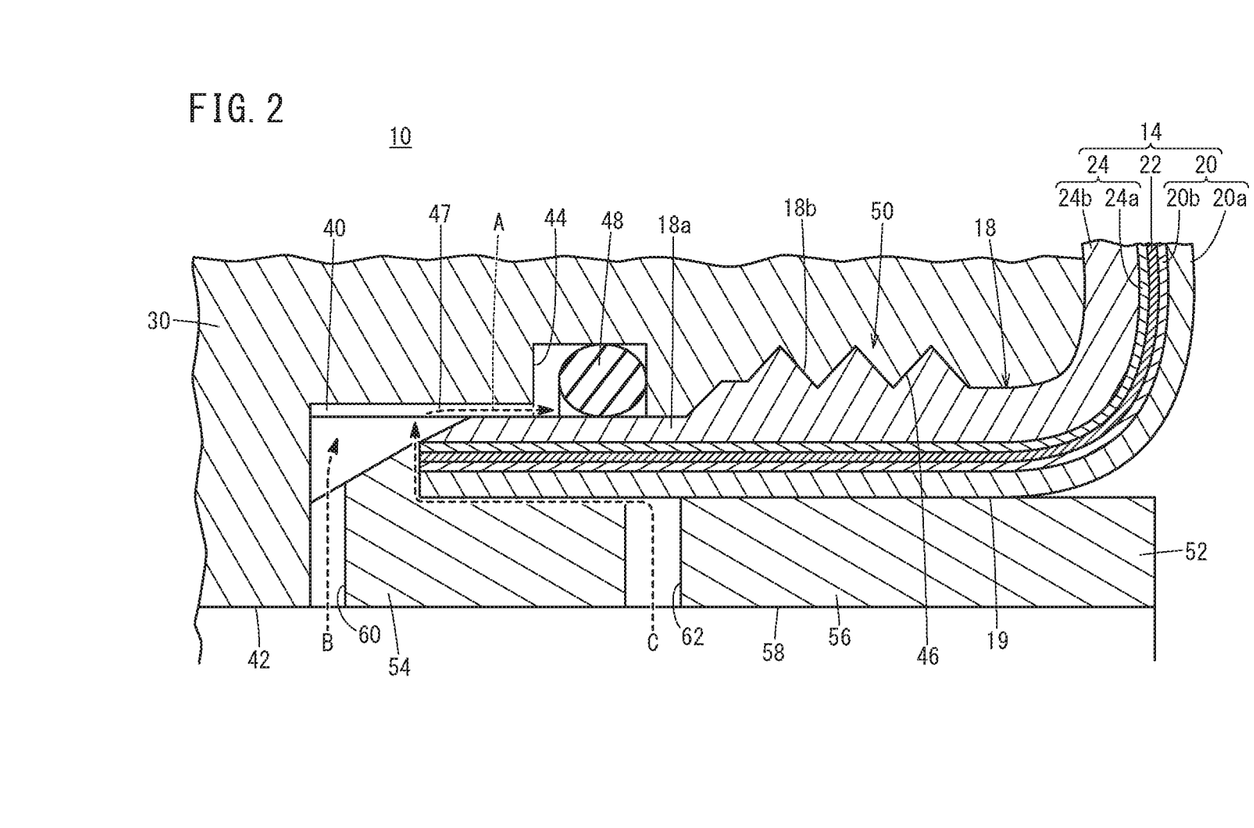
FIG. 2 is an enlarged cross sectional view showing a high pressure tank in FIG. 1, as viewed from an opening side.

As shown in FIG. 2, the liner 14 is made up of a plurality of resin layers chiefly including an inner layer 20, a barrier layer 22, and an outer layer 24, and these layers are stacked together in the order recited, from the inner surface to the outer surface of the liner 14. The inner layer 20 is made up of two layers, an innermost layer 20a which forms the inner surface of the liner 14, and a first adhesive layer 20b interposed between the innermost layer 20a and a barrier layer 22. The outer layer 24 is made up of a second adhesive layer 24a stacked on the barrier layer 22, and an outermost layer 24b forming the outer surface of the liner 14.

For example, the barrier layer 22 is made of material having sufficiently low hydrogen permeability such as ethylene-vinyl alcohol copolymer (EVOH) resin. The innermost layer 20a and the outermost layer 24b are made of high density polyethylene (HDPE), and protect the barrier layer 22.

Preferably, polyethylene based resin, particularly preferably, low density polyethylene (LDPE) may be adopted as material of the first adhesive layer 20b and the second adhesive layer 24a. The first adhesive layer 20b and the second adhesive layer 24a seal the space between the innermost layer 20a and the barrier layer 22, and the space between the barrier layer 22 and the outermost layer 24b, respectively. In the liner 14 having the above structure, diffusion of hydrogen molecules infiltrated into the inner layer 20 toward the outer layer 24, and diffusion of hydrogen molecules infiltrated into the outer layer 24 toward the inner layer 20 can be prevented by the barrier layer 22.

By designing the thickness of the liner 14 including all of the resin layers to be 1 mm or more, it is possible to obtain the rigidity required in producing the liner 14 and assembling the high pressure tank 10.

An insertion hole 19 is formed in the tubular portion 18. The insertion hole 19 is connected to the hollow space inside the liner 14. Further, the tubular portion 18 includes a thin portion 18a at a protruding end (front end) of the tubular portion 18. Further, a male screw 18b is formed in the tubular portion, on the proximal end side of the thin portion 18a. The thickness of the thin portion 18a is smaller than the other parts. Preferably, the thin portion 18a has the thickness of 1 mm or more to have the sufficient rigidity as described above.

As shown in FIG. 1, a cap 30 is externally fitted to the tubular portion 18. For example, the cap 30 is made of metal, and includes a cylindrical protrusion 32. A supply/discharge hole 34 passes through the cap 30 along an axial core of the protrusion 32. Further, the cap 30 further includes a shoulder 36 extending from the proximal end of the protrusion 32, like a circular disk. Both of the outer circumferential surface of the shoulder 36 and the liner 14 are covered with the reinforcing layer 12. Therefore, the shoulder 36 of the cap 30 is covered with the liner 14 and the reinforcing layer 12, and the protrusion 32 protruding from the opening of the reinforcing layer 12 is exposed to the outside.

The outer diameter of protrusion 32 is substantially constant, and the inner diameter of the protrusion 32, i.e., the diameter of the supply/discharge hole 34 varies depending on its position. Specifically, the supply/discharge hole 34 includes a medium inner diameter part 38 on the side of the protrusion 32 in the axial direction, a large inner diameter part 40 on the side of the shoulder 36, and a small inner diameter part 42 positioned between the medium inner diameter part 38 and the large inner diameter part 40. A high pressure hose (not shown) is detachably connected to the medium inner diameter part 38 through a valve (not shown).

The tubular portion 18 is inserted into the large inner diameter part 40. Thus, the outer circumferential surface of the tubular portion 18 is provided along the inner circumferential surface of the large inner diameter part 40. Therefore, the inner diameter of the large inner diameter part 40 is determined to have a size corresponding to the outer diameter of the tubular portion 18. Specifically, in the large inner diameter part 40, the inner diameter at a position facing the thin portion 18a is smaller than the inner diameter at a position facing the proximal end side of the thin portion 18a. Further, an annular seal groove 44 is formed in the inner wall of the large inner diameter part 40, at a position facing the thin portion 18a of the tubular portion 18.

The seal groove 44 extends along the circumference of the large inner diameter part 40. Further, a female screw 46 is formed in the inner wall of the large inner diameter part 40, at a position facing the male screw 18b of the tubular portion 18. The female screw 46 is screw engaged with the male screw 18b.

Further, four cap grooves 47 are formed in the inner wall of the large inner diameter part 40 at substantially equal intervals in the circumferential direction. Each of the cap grooves 47 extends in the axial direction, and the cap grooves 47 are connected to the seal groove 44. In FIG. 1, two of the four cap grooves 47 are shown. By the cap grooves 47, as described later, a first fluid inlet channel A (see FIG. 2) is formed between the inner circumferential surface of the large inner diameter part 40 and the outer circumferential surface of the tubular portion 18.

A seal member 48 in the form of an O-ring is provided in the seal groove 44. As shown in FIG. 2, a distance (seal gap) between the inner wall surface of the seal groove 44 and the outer layer 24 of the thin portion 18a is determined in a manner that the seal member 48 between the inner wall surface of the seal groove 44 and the outer layer 24 of the thin portion 18a is kept compressed. In this manner, the space between the outer circumferential surface of the tubular portion 18 and the inner circumferential surface of the supply/discharge hole 34 of the cap 30 is sealed.

Figure 3:
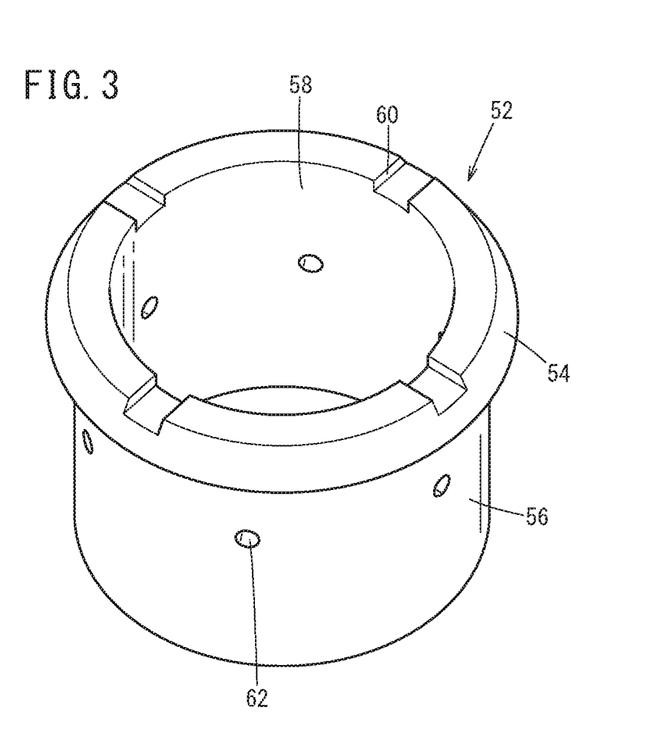
FIG. 3 is a perspective view showing a collar in FIG. 1.

Further, by bringing the male screw 18b into screw engagement with the female screw 46, a joint part 50 is formed. The joint part 50 joins the outer circumferential surface of the tubular portion 18 and the inner circumferential surface of the large inner diameter part 40 together. The joint part 50 is positioned in the tubular portion 18, on the proximal end side of the seal member 48. Further, a collar 52 is provided inside the large inner diameter part 40 to support the tubular portion 18. For example, the collar 52 is made of metal. As shown in FIG. 3, the collar 52 includes an annular head 54, and a cylindrical body 56 formed integrally with the head 54. A passage hole 58 extends through the collar 52 in the axial direction of the cylindrical body 56.

On one end surface of the head 54, four radial grooves 60 extending in the radial direction are formed at equal intervals in the circumferential direction. A stepped surface is formed between the small diameter part 42 and the large inner diameter part 40, and by the radial grooves 60, as described later, a second fluid inlet channel B (see FIG. 2) is formed between the stepped surface and the one end surface of the head 54. Further, the circumferential surface of the head 54 has a tapered shape expanded from one end surface to the other end surface. As shown in FIGS. 1 and 2, in the large inner diameter part 40, the one end surface of the head 54 contacts the stepped surface formed between the small inner diameter part 42 and the large inner diameter part 40, and the other end surface of the head 54 contacts the protruding end surface of the tubular portion 18.

As shown in FIG. 3, six through holes are formed in the cylindrical body 56 at equal intervals in the circumferential direction. The through holes 62 extend through the inner circumferential surface and the outer circumferential surface of the cylindrical body 56. That is, as shown in FIG. 2, the through hole 62 is connected to the insertion hole 19 and the passage hole 58. By the through hole 62, as described later, a third fluid inlet channel C (see FIG. 2) is formed between the inner circumferential surface and the outer circumferential surface of the cylindrical body 56.

The cylindrical body 56 is inserted into the insertion hole 19 of the tubular portion 18. As a result, the passage hole 58 is connected to the inside of the supply/discharge hole 34 and the inside of the liner 14. Further, the outer circumferential surface of the cylindrical body 56 is provided around the inner circumferential surface of the large inner diameter part 40 through the tubular portion 18. That is, the tubular portion 18 is held between the outer circumferential surface of the cylindrical body 56 and the inner circumferential surface of the large inner diameter part 40 (supply/discharge hole 34).

From the viewpoint of suitably holding the tubular portion 18 to a greater extent, preferably, the cylindrical body 56 is inserted into the tubular portion 18 under pressure. It is because, in this case, since the cylindrical body 56 presses the tubular portion 18 toward the inner circumferential surface of the large inner diameter part 40, the outer circumferential surface of the tubular portion 18 presses/contacts the inner circumferential surface of the large inner diameter part 40.

The high pressure tank 10 according to the embodiment of the present invention basically has the above structure. The liner 14 having the above tubular portion 18 can be obtained easily by applying known blow molding. Further, since the collar 52 has simple structure only including the head 54 and the cylindrical body 56, the collar 52 can be attached to the large inner diameter part 40 and the tubular portion 18 easily. That is, the high pressure tank 10 can be produced easily using simple constituent elements.

In this high pressure tank 10, as described above, by connecting the high pressure hose to the medium inner diameter part 38 of the cap 30, the hydrogen gas is supplied from a hydrogen supply source (not shown) into the liner 14 through the supply/discharge hole 34 and the passage hole 58. In the structure, the hydrogen gas contained in the liner 14 can be discharged through an open/close valve (not shown) attached to the medium inner diameter part 38 and the hydrogen gas is supplied to a pipe, etc. (not shown) connected to the fuel cell system (not shown).

Even if supply/discharge of the hydrogen gas is repeated in this manner, the high pressure tank 10 maintains excellent durability and sealing performance. That is, in the high pressure tank 10, as described above, the tubular portion 18 is provided along the inner circumferential surface of the large inner diameter part 40, and the seal member 48 is provided between the outer circumferential surface of the tubular portion 18 and the inner circumferential surface of the large inner diameter part 40. Therefore, the internal pressure of the hydrogen gas is applied in a direction to press the tubular portion 18 toward the seal member 48 to provide so-called self-sealing structure. As a result, even if the high internal pressure is applied, it is possible to maintain the state of the seal gap constantly, and suitably seal the space between the outer circumferential surface of the tubular portion 18 and the inner circumferential surface of the large inner diameter part 40.

Further, as described above, the tubular portion 18 is held between the cylindrical body 56 of the collar 52 and the inner circumferential surface of the large inner diameter part 40. Therefore, even if the pressure of the hydrogen gas is applied from the front end surface of the tubular portion 18, peeling of the tubular portion 18 from the inner circumferential surface of the large inner diameter part 40 is suppressed. Further, since deformation by compression due to the decrease in the temperature, the creep, etc. is suppressed, it is possible to suitably maintain the state of the seal gap for long time.

This collar 52 has the simple structure as described above. Therefore, it is possible to avoid complicated structure as in the case of embedding the collar 52 in the wall of the tubular portion 18. Further, since the edge of the collar 52 does not contact the tubular portion 18 (liner 14), it is possible to avoid concentration of the stress on tubular portion 18, occurrence of fatigue damages, etc. That is, it is possible to improve the durability of the high pressure tank 10.

Further, some of the hydrogen gas in the liner 14 is guided to a position between the inner circumferential surface of the large inner diameter part 40 and the outer circumferential surface of the head 54 by the second fluid inlet channel B. The stepped surface is formed between the small inner diameter part 42 and the large inner diameter part 40 of the supply/discharge hole 34, and the second fluid inlet channel B is formed between the stepped surface and the radial grooves 60 of the collar 52. Then, the hydrogen gas is guided into the seal groove 44 by the first fluid inlet channel A formed between the cap groove 47 and the outer circumferential surface of the tubular portion 18.

The remaining hydrogen gas in the liner 14 is guided into a space between the outer circumferential surface of the cylindrical body 56 and the inner circumferential surface of the tubular portion 18 from the inside (passage hole 58) of the cylindrical body 56 through a third inlet fluid channel C formed by the through hole 62 of the collar 52. This hydrogen gas presses the tubular portion 18 from the inner circumferential side of the tubular portion 18 toward the large inner diameter part 40 of the cap 30. In this manner, it is possible to improve the self-sealing function of the seal member 48. Further, this hydrogen gas flows toward the protruding end of the tubular portion 18, and then, the hydrogen gas is guided into the seal groove 44 by the first fluid inlet channel A formed between the inner circumferential surface of the large inner diameter part 40 and the outer circumferential surface of the tubular portion 18.

That is, in the high pressure tank 10 according to the embodiment of the present invention, by the first fluid inlet channel A, the second fluid inlet channel B, and the third fluid inlet channel C, a fluid inlet channel is formed for guiding fluid from the protruding end of the tubular portion 18 into the seal groove 44, through the space between the inner circumferential surface of the supply/discharge hole 34 and the outer circumferential surface of the tubular portion 18. By this fluid inlet channel, it is possible to efficiently guide the hydrogen gas into the seal groove 44, and increase the internal pressure of the seal groove 44. As a result, it becomes possible to apply pressure to the portion of the tubular portion 18 facing the seal groove 44 substantially uniformly from the inner circumferential surface and the outer circumferential surface. Therefore, it is possible to avoid entry of the tubular portion 18 into the seal groove 44. Also for this reason, it becomes possible to suitably maintain the state of the seal gap for long time.

Further, as described above, in the seal groove 44 where the hydrogen gas is supplied from the protruding end of the tubular portion 18, and the internal pressure is increased, the seal member 48 is pressed toward a side (toward the proximal end of the tubular portion 18) opposite to the side where the hydrogen gas is supplied. Accordingly, the seal member 48 is compressed in the seal groove 44, and it is possible to maintain the state having the desired sealing performance.

In this regard, since the part of the tubular portion 18, on the front end side of the seal member 48, including the end surface, the inner circumferential surface, and the outer circumferential surface of the tubular portion 18 are exposed to the hydrogen gas, in comparison with the part of the tubular portion 18, on the rear end side of the seal member 48, hydrogen molecules tend to be infiltrated into the tubular portion 18. If the hydrogen molecules are infiltrated, and retained inside the tubular portion 18, cracks and/or blisters (swelling) may occur.

However, in the high pressure tank 10 according to the embodiment of the present invention, as described above, the joint part 50 joining the outer circumferential surface of the tubular portion 18 and the inner circumferential surface of the large inner diameter part 40 is provided in the tubular portion 18, on the proximal end side of the seal member 48. In the structure, since it is possible to suppress infiltration of hydrogen molecules into the joint part 50 of the tubular portion 18, it is possible to suitably maintain the joining state by the joint part 50.

As described above, in the high pressure tank 10 according to the embodiment of the present invention, with the simple structure, it is possible to maintain the state of the seal gap between the liner 14 and the cap 30 for long time constantly, and thus, it is possible to achieve the excellent sealing performance for long time.

The present invention is not limited to the above described embodiment. Various modifications may be made without departing from the gist of the present invention.

Figure 4:
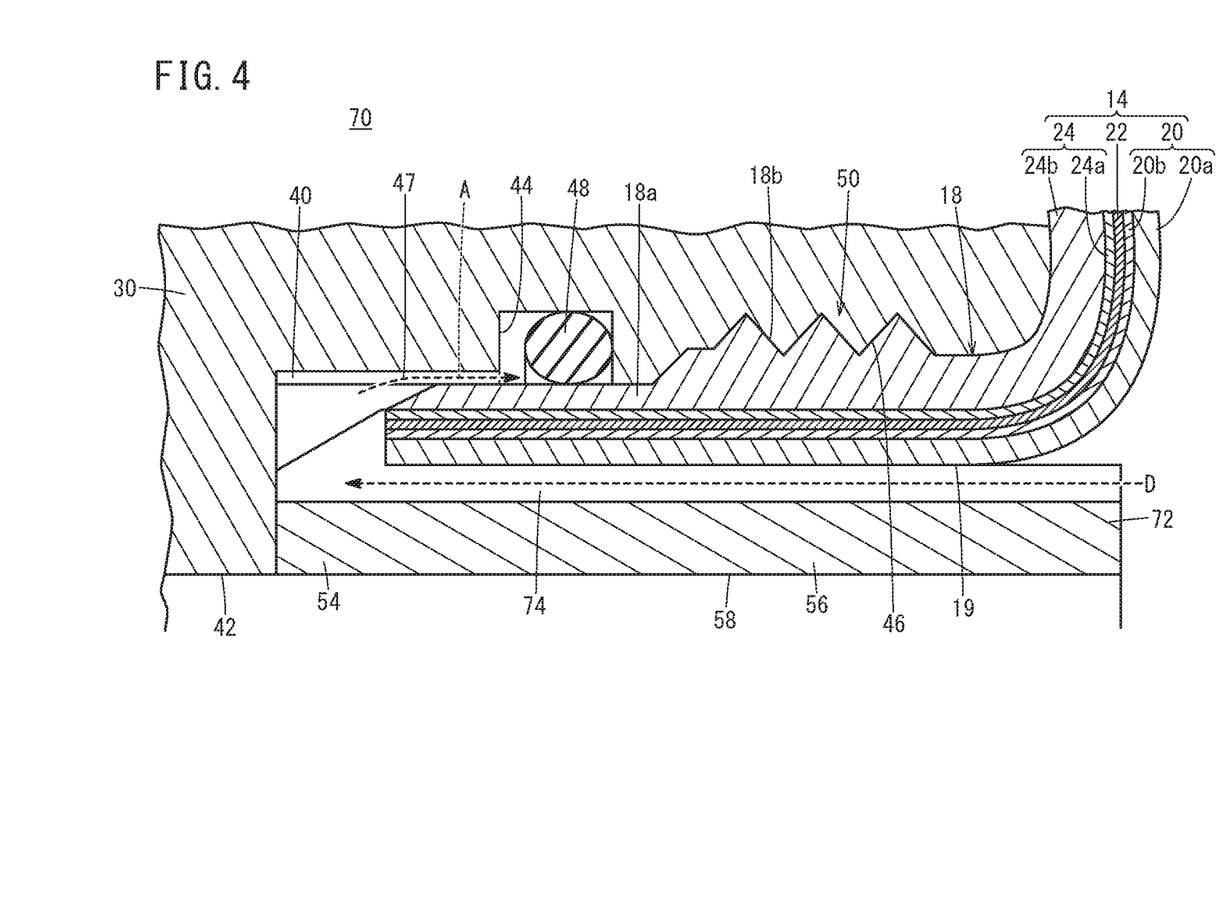
FIG. 4 is an enlarged cross sectional view showing a high pressure tank according to another embodiment of the present invention, as viewed from an opening side.
Figure 5:
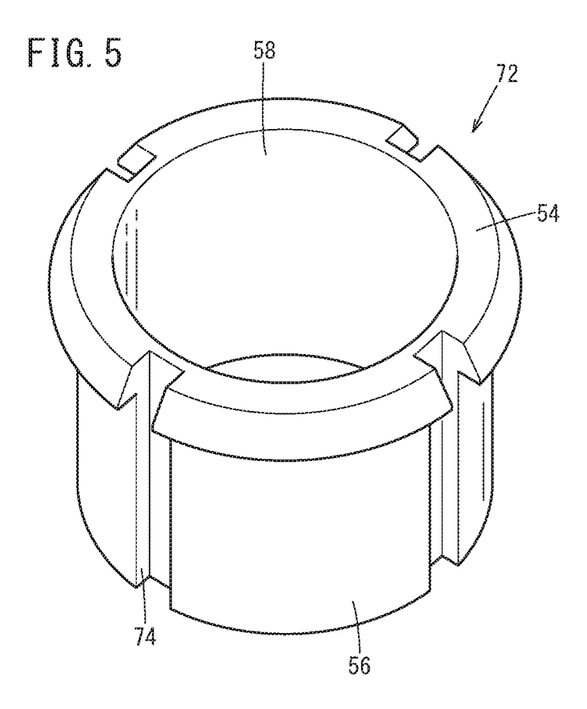
FIG. 5 is a perspective view showing a collar in FIG. 4.

For example, as in the case of a high pressure tank 70 according to another embodiment of the present invention shown in FIGS. 4 and 5, a collar 72 may be provided instead of the collar 52. Also in this case, the same effects and advantages as in the case of the above described high pressure tank 10 can be obtained.

Among the constituent elements shown in FIGS. 4 and 5, constituent elements having the functions and effects that are same as or similar to those shown in FIGS. 1 to 3 are labeled with the same reference numeral, and the detailed description is omitted.

Specifically, the collar 72 has the same structure as the collar 52 except that axial grooves 74 are provided in the outer circumferential surface of the collar 72 instead of the radial grooves 60 and the through hole 62. That is, four axial grooves 74 are formed in the outer circumferential surface of the collar 72 at equal intervals in the circumferential direction. The axial grooves 74 extend from one end to the other end of the collar 72 in the axial direction. By the axial grooves 74, a fourth fluid inlet channel D (see FIG. 4) is formed between the inner circumferential surface of the tubular portion 18 and the axial grooves 74.

In the high pressure tank 70, by the fourth fluid inlet channel D, some of the hydrogen gas in the liner 14 flows between the inner circumferential surface of the tubular portion 18 and the outer circumferential surface of the collar 72, from the proximal end to the protruding end of the tubular portion 18. The hydrogen gas presses the tubular portion 18 from the inner circumferential side of the tubular portion 18 toward the large inner diameter part 40 of the cap 30. In this manner, it becomes possible to improve the self-sealing function of the seal member 48. Further, this hydrogen gas is guided into the seal groove 44 by the first fluid inlet channel A formed between the cap groove 47 and the outer circumferential surface of the tubular portion 18.

That is, in the high pressure tank 70 according to the embodiment, by the first fluid inlet channel A and the fourth fluid inlet channel D, a fluid inlet channel is formed for guiding the fluid from the protruding end of the tubular portion 18 into the seal groove 44, through the space between the inner circumferential surface of the supply/discharge hole 34 to the outer circumferential surface of the tubular portion 18. By the fluid inlet channel, the hydrogen gas is effectively guided into the seal groove 44, and it is possible to increase the internal pressure of the seal groove 44. As a result, it becomes possible to apply pressure to the portion of the tubular portion 18 facing the seal groove 44 substantially uniformly from the inner circumferential surface and the outer circumferential surface. Therefore, it is possible to avoid entry of the tubular portion 18 into the seal groove 44, and it becomes possible to suitably maintain the state of the seal gap for long time.

In the high pressure tanks 10, 70, according to the embodiments of the present invention, the joint part 50 for joining the outer circumferential surface of the tubular portion 18 and the inner circumferential surface of the large inner diameter part 40 is formed by screw engagement of the male screw 18b of the tubular portion 18 and the female screw 46 of the large inner diameter part 40. However, the present invention is not limited in this respect specially. For example, the joint part may be formed by adhering the outer circumferential surface of the tubular portion 18 and the inner circumferential surface of the large inner diameter part 40 to each other using adhesive. Also in this case, as described above, since it is possible suppress infiltration of hydrogen molecules into the joint part of the tubular portion 18, it is possible to suitably maintain the joining state by the joint part.

In the high pressure tank 10 according to the above embodiment, the fluid inlet channel is formed by the first fluid inlet channel A, the second fluid inlet channel B, and the third fluid inlet channel C. In the high pressure tank 70 according to the above embodiment, the fluid inlet channel is formed by the first fluid inlet channel A and the fourth fluid inlet channel D. However, the present invention is not limited in this respect specially. For example, the fluid inlet channel may be formed by any combination of two or more of the first fluid inlet channel A to the fourth fluid inlet channel D, may be formed by any one of the first fluid inlet channel A to the fourth fluid inlet channel D, or may be formed by all of the first inlet channel A to the fourth fluid inlet channel D.

That is, the cap 30 may not have the cap groove 47. Further, the collar 52 may have only one of the radial grooves 60 and the through hole 62, and may have neither the radial grooves 60 nor the through hole 62. Further, as in the case of the collar 72, the collar 52 may have the axial grooves 74. Further, the cap groove 47, the radial grooves 60, the through hole 62, and the axial grooves 74 are not limited to the number, the layout, the shape, etc. described above.

What is claimed is:

1. A high pressure tank configured to supply and discharge fluid, the tank comprising:
    a liner made of resin, and configured to contain the fluid, a tubular portion protruding from the liner, the tubular portion having an internal insertion hole;
    a cap having a supply/discharge hole, the tubular portion being configured to be inserted into the supply/discharge hole;
    a collar configured to be inserted into the insertion hole, the collar including a cylindrical body having an internal passage hole connected to the liner, the tubular portion being held between an outer circumferential surface of the cylindrical body and an inner circumferential surface of the supply/discharge hole; and
    a seal member provided in a seal groove formed in the inner circumferential surface of the supply/discharge hole, the seal member being configured to seal a space between the inner circumferential surface of the supply/discharge hole and the outer circumferential surface of the tubular portion,
    wherein a fluid inlet channel is formed at least in one of the cap and the collar, for guiding the fluid from a protruding end of the tubular portion into the seal groove through the space between the inner circumferential surface of the supply/discharge hole and the outer circumferential surface of the tubular portion.

2. The high pressure tank according to claim 1, wherein at least part of the fluid inlet channel is formed by a cap groove formed in the inner circumferential surface of the supply/discharge hole, and the cap groove is connected to the seal groove.

3. The high pressure tank according to claim 1, wherein at least part of the fluid inlet channel is formed by a through hole passing through an inner circumferential surface and the outer circumferential surface of the cylindrical body.

4. The high pressure tank according to claim 1, wherein the collar includes a head provided in a marginal portion at one end of the cylindrical body to contact a protruding end surface of the tubular portion; and
    at least part of the fluid inlet channel is formed by a radial groove provided in the head.

5. The high pressure tank according to claim 1, wherein at least part of the fluid inlet channel is formed by an axial groove provided in an outer circumferential surface of the collar to extend from one end to another end of the collar in an axial direction.

* * * * *